(12) United States Patent
Angelescu et al.

(10) Patent No.: US 8,859,090 B2
(45) Date of Patent: Oct. 14, 2014

(54) MICRO-STRUCTURED SURFACE HAVING TAILORED WETTING PROPERTIES

(75) Inventors: Dan Angelescu, Noisy le Grand Cedex (FR); Tullio Moscato, Paris (FR); Frederic Pauchet, Montigny sur Loing (FR); Robert Van Kuijk, Le Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 883 days.

(21) Appl. No.: 13/062,721

(22) PCT Filed: Aug. 24, 2009

(86) PCT No.: PCT/EP2009/006232
§ 371 (c)(1),
(2), (4) Date: Aug. 15, 2011

(87) PCT Pub. No.: WO2010/028752
PCT Pub. Date: Mar. 18, 2010

(65) Prior Publication Data
US 2011/0283778 A1    Nov. 24, 2011

(51) Int. Cl.
*B32B 3/00* (2006.01)
*B01D 69/02* (2006.01)

(52) U.S. Cl.
CPC .......... *B01D 69/02* (2013.01); *B01D 2325/028* (2013.01); *B01D 2325/06* (2013.01)
USPC ....................................................... 428/315.5

(58) Field of Classification Search
USPC ................. 428/315.5, 315.7, 315.9
See application file for complete search history.

(56) References Cited

U.S. PATENT DOCUMENTS

| 4,780,211 | A | * | 10/1988 | Lien ............................... 210/644 |
| 4,902,308 | A | * | 2/1990 | Mallouk et al. .................... 95/50 |
| 5,183,701 | A | * | 2/1993 | Jacobs et al. .................. 442/118 |
| 6,808,867 | B2 | * | 10/2004 | Doshi et al. .................... 430/320 |
| 2006/0266700 | A1 | * | 11/2006 | Ku et al. .................. 210/500.21 |
| 2007/0058483 | A1 | * | 3/2007 | Aizenberg et al. ............ 366/127 |
| 2008/0166542 | A1 | * | 7/2008 | Sung et al. ................. 428/315.9 |

FOREIGN PATENT DOCUMENTS

GB    2417913    3/2006

OTHER PUBLICATIONS

M. Reyssat et al. "Bouncing transitions on microtextured materials," 2006 Europhysics Letters, 74 pp. 306-312.
A. Tuteja et al. "Designing Superoleophobic Surfaces," Dec. 7, 2007, Science vol. 318, No. 5856, pp. 1618-1622.
K.S.K Lau et al. "Superhydrophobic Carbon Nanotube Forests," 2003 Nano Letters vol. 3, Issue 12, pp. 1701-1705.

* cited by examiner

*Primary Examiner* — Hezron E Williams
*Assistant Examiner* — Nathaniel Kolb
(74) *Attorney, Agent, or Firm* — Stephanie Chi; Tim Curington

(57) ABSTRACT

A micro-structured surface for immersing in a multiphase fluid mixture comprises a substrate having pores and a wetting liquid phase trapped in the pores. The wetting liquid phase is immiscible with all the phases of the multiphase fluid mixture. Alternatively, the wetting liquid phase is miscible with one of the phase of the multiphase fluid mixture.

19 Claims, 5 Drawing Sheets

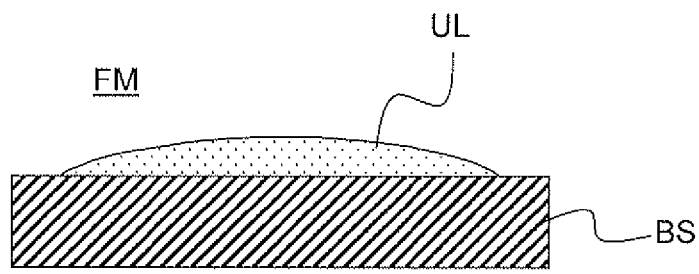
FIG. 1 - PRIOR ART
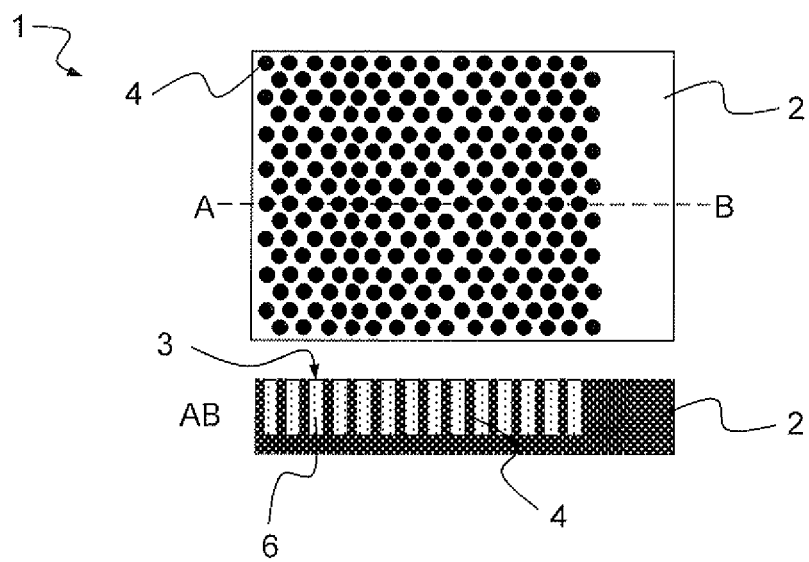
FIG. 2
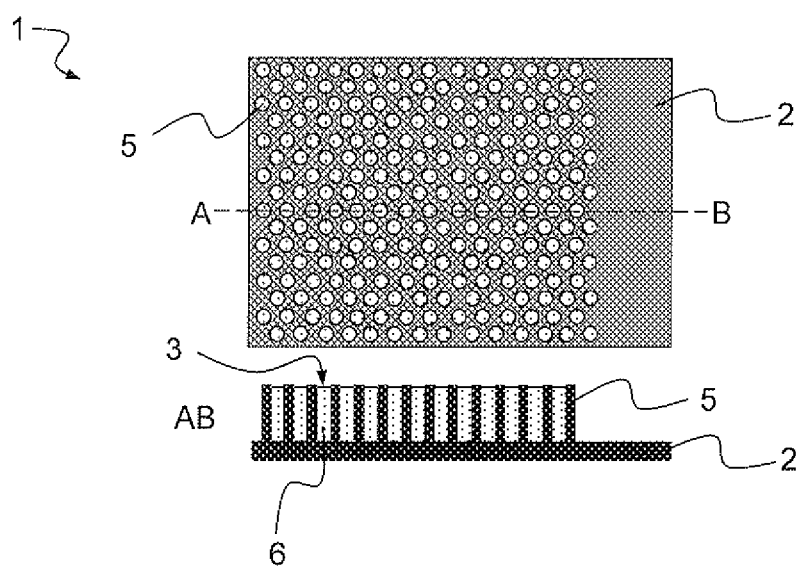
FIG. 3

MICRO-STRUCTURED SURFACE HAVING TAILORED WETTING PROPERTIES

FIELD

An aspect of the disclosure relates to a micro-structured surface for immersing in a multiphase fluid. Another aspect of the disclosure relates to application of the micro-structured surface in measuring device. A further aspect of the disclosure relates to a method of manufacturing the micro-structured surface.

BACKGROUND

FIG. 1 is a cross sectional view in a surface made of a bare substrate BS illustrating the wetting behavior by a droplet of a liquid UL. Wetting is the contact between a liquid and a solid surface. Wetting behavior results from intermolecular interactions when a liquid droplet approaches and contacts the solid surface. The degree of wetting depends on surface tensions of the liquid-vapor interface and the solid-liquid interface such that the total energy is minimized. As an example, FIG. 1 illustrates a favorable wetting behavior in which the contact angle is low and the liquid droplet UL spreads to cover a large area on the surface BS. In particular applications, for example optical applications, it is desirable to avoid, at least reduce the favorable wetting behavior of the surface by droplets of undesired liquid phase. Wetting behavior of a surface surrounded by a gas (such as air) can be modified by micro-patterning at the sub-micron to several micron scales, and/or by chemically treating the surface. For example, a surface may become superhydrophobic (i.e. completely repelling water) or superoleophobic (i.e. completely repelling both oil and water). In such situations, the droplets of the undesired phase (water in the case of hydrophobic surfaces, or oil and water in the case of oleophobic surfaces), typically bead on the surface, making contact only with the raised portion of the micro-pattern that may be present on the surface. Nevertheless, these wetting behaviors are cancelled, at least reduced when a liquid medium at high pressure and high temperature conditions is encountered. In these situations, the micro-pattern of the surface may become completely wetted by the liquid medium, as the gas that would normally be trapped within the micro-pattern dissolves in the highly pressurized liquid. In such situations the wetting behavior of the surface reverts back to the one of the hereinbefore described surface made of a bare substrate, or even worse, it may become completely wet by the unwanted liquid medium. It would be desirable to maintain the superhydrophobicity or superoleophobicity effects of the surface in a larger range of pressure and temperatures, in particular in high pressure and high temperature situations.

SUMMARY

It is an object of the disclosure to propose a micro-structured surface for immersing in a multiphase fluid mixture that overcomes at least one of the drawbacks of the prior art.

According to a first aspect, the disclosure relates to a micro-structured surface for immersing in a multiphase fluid mixture comprising a substrate having pores and a wetting liquid phase trapped in the pores, said wetting liquid phase being immiscible with at least one phase of the multiphase fluid mixture.

According to a second aspect, the disclosure relates to a micro-structured surface for immersing in a multiphase fluid mixture comprising a substrate having pores and a wetting liquid phase trapped in the pores, the wetting liquid phase being miscible with at least one phase of the multiphase fluid mixture.

The substrate may receive a chemical treatment improving the wetting of the substrate by the wetting liquid phase.

The surface may comprise a closed-cell network of micro-wells made in the substrate, or an open-cell network of micro-pillars made on the substrate, or any combination thereof forming the pores in the substrate.

The substrate may be made of a material chosen in the group of material comprising silicon, silicon oxide, glass, metal, ceramic, sapphire, alumina, titanium oxide, fluorinated polymer, plastics, naturally porous material, mesh, and solid foam.

The substrate may be covered with a coating film. The film may be fluoropolymer film, fluorocarbon film, photocatalytic film, titanium dioxide film, silicon dioxide film, or metal film.

The wetting liquid phase may be a fluorinated solvent.

According to a further aspect, the disclosure relates to a measuring device comprising a micro-structured surface according to the disclosure, the surface being in contact with a multiphase fluid mixture.

The measuring device may further comprise a radiation source for permanently or periodically activating the micro-structured surface by exposure to radiation.

According to still a further aspect, the disclosure relates to a method of manufacturing a micro-structured surface having a controlled wetting property comprising the steps of providing a micro-structured surface, and trapping a wetting liquid phase within the micro-structured surface through a surface priming process.

The step of providing a micro-structured surface may further comprise the step of micro-structuring a substrate. Alternatively, it may consist in providing a naturally porous material.

The step of providing a micro-structured surface may be further followed by a conformal coating or film deposition step. The coating or film having photocatalytic properties may be activated upon exposure to a source of radiation.

The surface priming process step may comprise the steps of submerging the micro-structured surface inside the wetting liquid phase, pulling a vacuum by reducing an initial pressure enough so that the gas phases initially trapped in the micro-structured surface leaves the pores of the micro-structured surface, and increasing the pressure to the initial pressure. The pressure reduction and increasing cycle may be repeated several times.

Alternatively, the surface priming process may comprise the steps of putting the wetting liquid phase into contact with the micro-structured surface, pressurizing the micro-structured surface and the wetting liquid phase such as to allow the gas phases initially trapped in the microstructure to diffuse into the liquid, waiting a determined duration, and decreasing the pressure to the initial pressure.

The disclosure enables tailoring the wetting properties of solid surfaces in contact with multiple liquid phases. A droplet or slug of an undesired phase which may come in contact with the solid surface will therefore experience a mixed boundary, consisting partly of the solid substrate, and partly of the liquid phase trapped in the surface microstructure. By modifying the ratio of the trapped wetting liquid phase area to the exposed substrate area in the micro-structured surface, the effective macroscopic wetting properties of the surface can be custom tailored such as to be comprised between those of the wetting liquid phase and those of the bare substrate. With the micro-structured surface of the disclosure, these tailored wetting properties of the solid surface can be maintained in a large range of pressure and temperature of the fluid mixture in which the surface is immersed.

These and other aspects of the disclosure will be apparent from and elucidated with reference to the embodiments described hereinafter.

BRIEF DESCRIPTION OF THE DRAWINGS

The present disclosure is illustrated by way of example and not limited to the accompanying figures, in which like references indicate similar elements:

FIG. 1 is a cross sectional view in a surface made of a bare substrate according to the prior art illustrating the wetting behavior by a droplet of an undesired liquid;

FIG. 2 schematically shows a top view (top part) and a cross sectional view (bottom part) of a closed-cell network of micro-wells on a substrate;

FIG. 3 schematically shows a top view (top part) and a cross sectional view (bottom part) of open-cell network of micro-pillars on a substrate;

DETAILED DESCRIPTION

Figure 4:
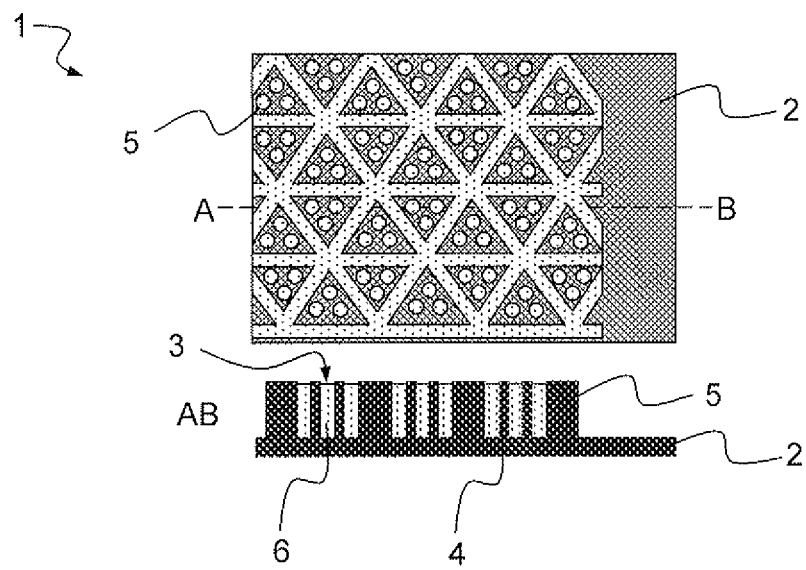
FIG. 4 schematically shows a top view (top part) and a cross sectional view (bottom part) of a micro-structured surface exhibiting a combination of open- and closed-cell network.

A micro-structured surface 1 of the disclosure comprises a solid surface having pores 3 and a wetting liquid phase 6 trapped in the pores 3. The micro-structured surface 1 can be designed with different patterns provided that the wetting liquid phase 6 can be trapped in the pores 3. The surface pattern may form either an open, or a closed network, or a combination thereof. As a first example, FIG. 2 schematically shows a top view and a cross sectional view of a closed-cell network of micro-wells 4 on a substrate 2. As a second example, FIG. 3 schematically shows a top view and a cross sectional view of an open-cell network of micro-pillars 5 on a substrate 2. As a third example, FIG. 4 schematically shows a top view and a cross sectional view of an hybrid open- and closed-cell network of micro-wells 4 and micro-pillars 5 on a substrate 2.

A cell network enables keeping the wetting liquid phase 6 trapped in the pores 3. The geometry of the pores 3 should be chosen to maximize the area exposed to the wetting liquid during a priming process (the priming process is described hereinafter), while trapping the wetting liquid by capillarity. The cell network may have any 2D topology, for example it may be a honeycomb structure, a square or triangular network, or an irregular network, etc. . . . . . The repeat spacing of the 2D well network may be at the scale of 100 nm to 100 µm in order to provide the optimal capillary trapping effect. The depth of the pores 3 may be of the same order, or larger, than the repeat spacing. The lateral size of a well should ideally be between 100 nm and 10 µm.

The trapping effect may be amplified by utilizing the hybrid open- and closed-cell network, where separate closed micro-wells 4 may also enclose micro-pillars 5. The usage of a closed-cell network, or a hybrid closed and open-cell networks also results in mechanically stronger and robust surfaces, as compared, for example, to free-standing pillars.

The wetting liquid phase 6 may be forced into the pores 3 of the surface microstructure, through a surface priming process. The priming process can be achieved in different ways that will be described hereinafter.

Figure 5:
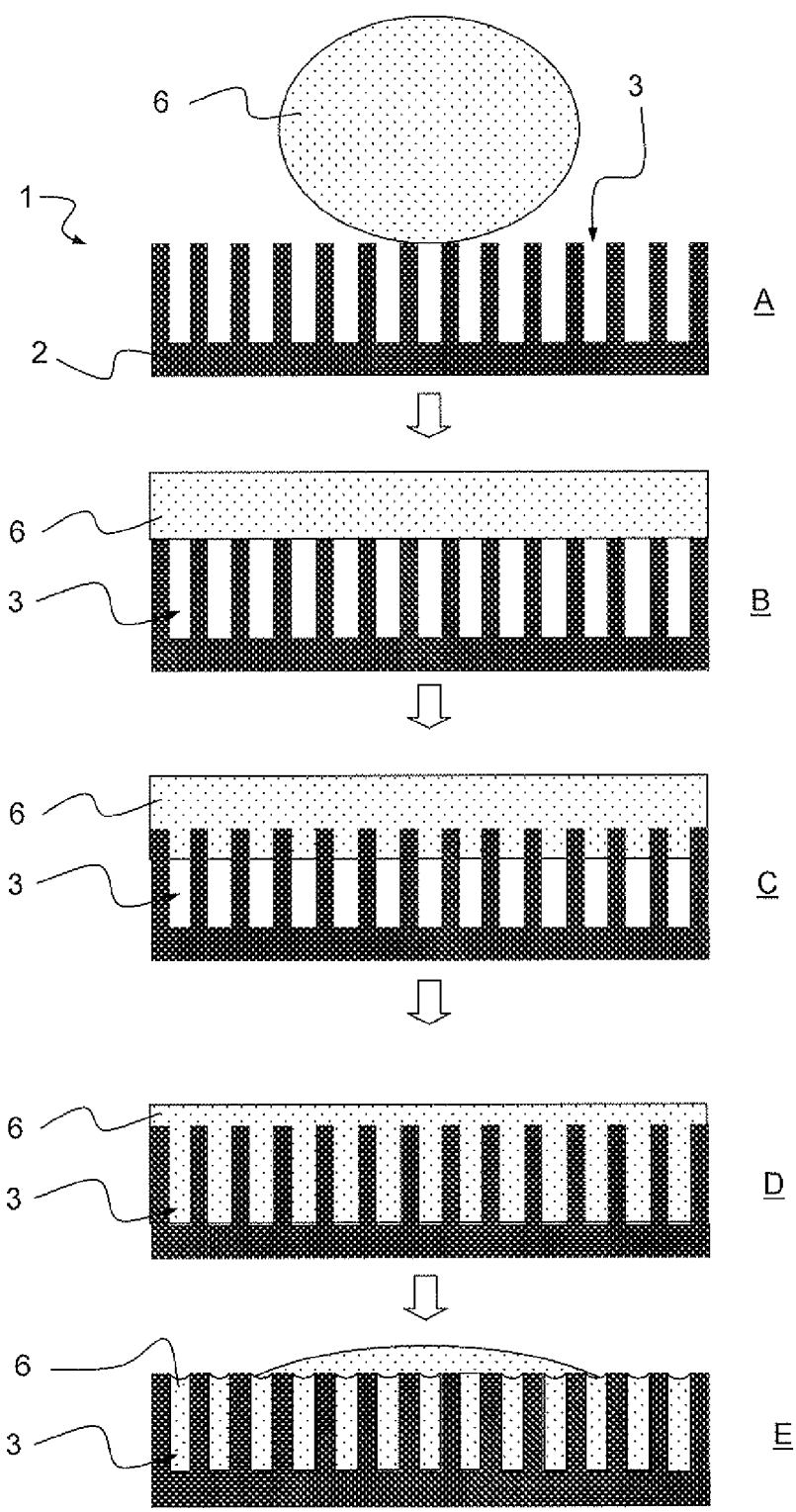
FIG. 5 is a sequence of frames (A-E) schematically illustrating a process of wetting a micro-structured surface according to the disclosure.

The wetting process consists in wetting a micro-structured surface initially not wet by a wetting liquid phase 6 as the pressure is increased, and the cushion of gas trapped under the droplet dissolves in the liquid. FIG. 5 schematically illustrates by a sequence of frames (A-E) the effect of pressurizing the wetting liquid phase 6 onto the micro-structured surface 1 having air trapped in the pores 3. In a first step A, at low pressures, the surface is not wet by the wetting liquid phase 6. In a second step B, the surface 1 is covered with the wetting liquid phase 6. Then, in a third step C the wetting liquid phase 6 is pressurized onto the micro-structured surface 1. In a fourth step D, the gas layer compresses and ultimately dissolves in the wetting liquid phase 6. After such a sequence, even if the pressure recovers a low value (step E), the micro-structured surface stays wetted by the liquid phase.

Figure 6:
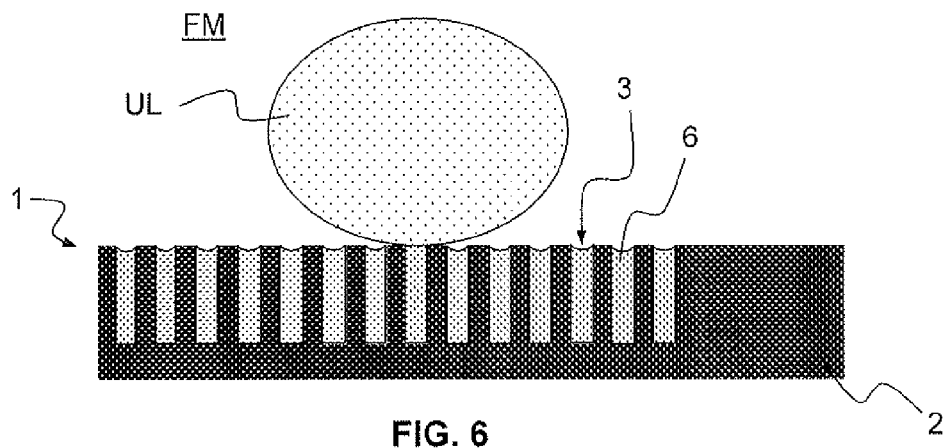
FIG. 6 is a cross sectional view in a micro-structured surface according to the disclosure illustrating the wetting behavior by a droplet of an undesired liquid.

FIG. 6 is a cross sectional view in a micro-structured surface 1 according to the disclosure illustrating the wetting behavior by a droplet of an undesired liquid encountering the micro-structured surface 1 primed with the wetting liquid phase 6. The droplet encounters a surface exhibiting an average surface energy situated between that of the wetting liquid phase 6 within the pores 3, and that of the substrate 2. The more area is dedicated to pores 3, the closer the properties of the micro-structured surface 1 will be equivalent to those of the wetting liquid phase 6. Advantageously, due to its primarily liquid nature, the interface between the droplet and the substrate 2 will be more resistant to fouling than an equivalent solid interface. The only contamination that may appear at such a liquid-liquid interface is by submicron particles significantly smaller than the microstructure pore size and which may be trapped at the interface by capillarity, or by surfactant molecules which may aggregate at the interface.

By carefully designing the micro-structured surface 1 topography and choosing the nature of the substrate 2 and the wetting liquid phase 6, it is possible to avoid, at least significantly reduce the probability that the wetting liquid phase 6 may leave the microstructure.

Advantageously, the wetting liquid phase 6 and the substrate 2 are chosen such that the wetting liquid phase 6 better wet the substrate 2 than any of the other phases present in the multiphase fluid mixture contacting the surface. In energetic terms, this implies that the surface energy of the interface between the solid substrate and the wetting liquid phase 6 is lower than that between the solid substrate and the undesired liquid phase. To the contrary, if this happens not to be the case, the micro-structured surface 1 would not be stable, as it can access a state of lower energy. The undesired liquid would gradually creep into the micro-structure and displace the wetting liquid, and the surface would lose the wetting properties it acquired just after priming. The surface will become wetted by the undesired liquid phase.

The substrate 2 surface may be made of silicon, silicon oxide, glass, etc. . . . The substrate 2 surface may also be made of a naturally porous material, such as a mesh, membrane, or solid foam, etc. . . . The substrate 2 may also be covered with a thin fluorocarbon film. The thin fluorocarbon film may be deposited according to know techniques. The fluorocarbon may be deposited as a monolayer film, for example by using fluorosilanes in the case of substrate 2 having polar groups similar to silicon oxide or glass. Alternatively, the fluorocarbon may also be deposited as a conformal layer, for example by atomic layer deposition or plasma deposition on any substrate 2. The substrate 2 may also be covered by a super-hydrophilic titanium dioxide film. The wetting liquid phase 6 may be a fluorinated solvent. Many fluorinated solvents are available commercially, for example such as Fluorinert manufactured by the company 3M™. Fluorinated solvents are available in different compositions and formulations, e.g. with very low vapor pressures and very low solubility in water and hydrocarbons.

Advantageously, by priming the micro-structured surface with a wetting phase that is immiscible with all the liquid phases of interest, yet wets the substrate better than any of the other liquid phases, it is possible to obtain a surface which may be oleophobic and hydrophobic. In particular, if the substrate is micro-structured with micro-wells, then covered with a fluorocarbon film by a plasma deposition process, and then primed with a fluorinated solvent, it is possible to obtain a surface that will naturally repel both water and hydrocarbon oils in ambient air.

The micro-structured surface 1 of the disclosure enables avoiding, at least significantly reducing that the wetting liquid phase 6 leaves the microstructure by, for example, evaporation, or dissolving into the undesired liquid, or by mixing with the undesired liquid, or by hydro-dynamical stresses caused by flow of the undesired liquid past the surface, or removal of the wetting liquid phase 6 by flow advection.

Using a fluorinated liquid as a wetting liquid phase 6 is particularly advantageous in applications in oilfield environment due to the lack of fluorinated surfactants. Thus, the fluorinated liquid interface will be less prone to contamination by surfactant molecules and advantageously maintains its wetting property for a longer time.

Figure 7:
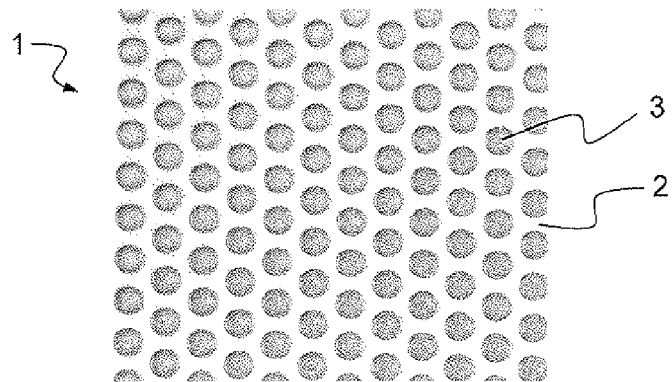
FIG. 7 is a top view of an embodiment of the micro-structured surface of the disclosure.

FIG. 7 is a top view of an embodiment of the micro-structured surface 1 of the disclosure. In this particular embodiment, the pores 3 having substantially the form of cylindrical wells are etched below the surface. The wells are arranged according to parallel lines (or columns) shifted in pairs. The micro-structured surface may be fabricated out of Silicon using standard micromachining processes, e.g. processes used in manufacturing microelectromechanical systems MEMS. For example, the micro-structured surface 1 is made from Silicon using a standard photolithography process followed by deep reactive ion etching and surface cleaning in an Oxygen plasma. The substrate 2 made of Silicon retains a thin layer of hydrophilic native oxide. The surface was primed with a wetting liquid made of tap water.

Figure 8:
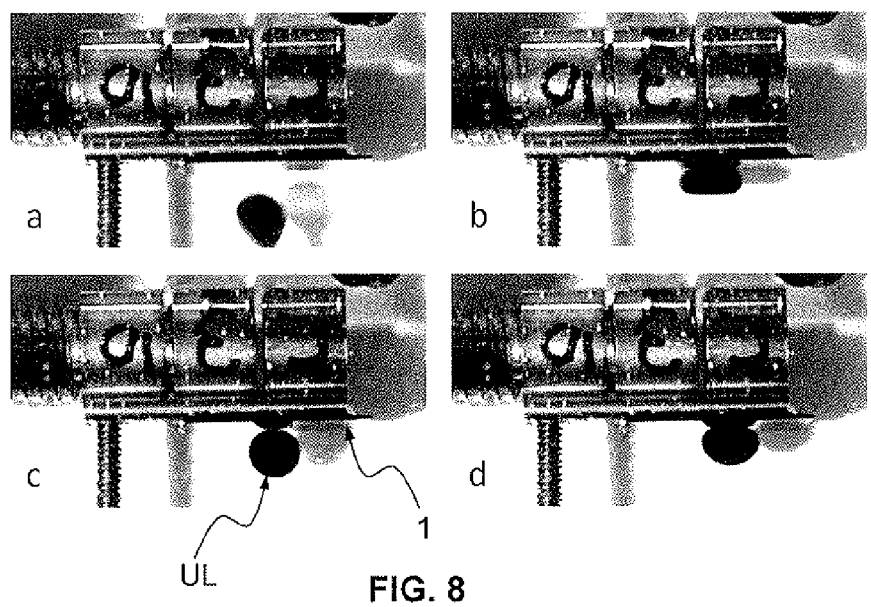
FIG. 8 is a sequence of frames (a-d) showing side 3D views illustrating the collision of a droplet of oil on the micro-structured surface of FIG. 7.

FIG. 8 is a sequence of frames (a), (b), (c) and (d) showing side 3D views illustrating the collision of a droplet of modified crude oil directed towards the micro-structured surface 1 of FIG. 5.

In frame (a), the oil droplet approaches the surface. In frame (b), the oil droplet collides with the micro-structured surface 1 of the disclosure and squishes to an oval shape. In frame (c), the oil droplet regains a spherical shape and eventually rebounds several times. Finally, in frame (d), the oil droplet sits on the surface. The oil droplet doesn't contact the surface, while being slightly deformed by its buoyancy. As a comparison, with a substrate 2 according to the prior art, the oil droplet would completely wet the Silicon substrate 2 as schematically depicted in FIG. 1.

Thus, the micro-structured surface exhibits a non-wetting behavior with respect to the oil droplet, which retains its round shape, and re-bounces from the surface upon contact. This characterizes an oleophobic behavior that lasted for several hours, even after the surface was completely submerged in oil for up to one hour. Long-term exposure (for several hours) to the oil environment may finally contaminate the surface, oil slowly replacing the water trapped in the pores 3 of the micro-structured surface 1. It is notable that the dynamics of the contamination is slow, and that the surface may indefinitely maintain its oleophobic properties if only exposed to oil for short periods at a time. It is also notable that when the micro-structured surface 1 is chemically treated to be better wetted by water, the oil-repellency effect lasts indefinitely.

Figure 9:
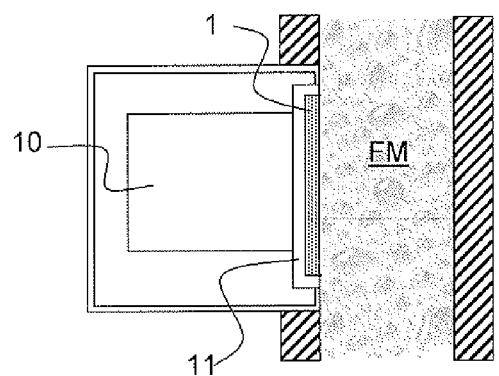
FIG. 9 schematically illustrates a measuring device comprising a window made of the micro-structured surface of the disclosure.

FIG. 9 schematically illustrates a measuring device 10 comprising an optical window 11 made of the micro-structured surface 1 of the disclosure. The micro-structured surface 1 may be used in any measuring device whose operation requires being in contact with one or several liquid phases without interfering with the other phases present in the fluid mixture. Possible examples of applications are optical windows 11 for spectroscopy measurements, or fluorescence measurements, or flow visualization, or thermal flow measurement, electrical conductivity or resistivity measurements, etc. . . . .

The method of manufacturing the micro-structured surface will now be described in relation with FIG. 10. The method comprises providing the micro-structured surface 1 that is able to trap the wetting liquid phase 6.

According to a first alternative PROV1, the provision PROV MS of the micro-structured surface 1 involves micro-structuring the surface BS-MS, namely manufacturing wells, or pillars, or a combination thereof on a bare substrate. As an example, the micro-structured surface 1 is made from Silicon using a standard photolithography process followed by deep reactive ion etching and surface cleaning in an Oxygen plasma.

According to a second alternative PROV2, the micro-structured surface 1 is made of a naturally porous material MS, such as a mesh, or a membrane, or a solid foam.

The pores 3 in the micro-structured surface 1 have a scale in the order of micrometers to several micrometers enabling trapping the wetting liquid phase 6 by capillarity within the micro-structured surface.

Then, optionally, the micro-structured surface may be covered FILM by a photo-catalytic film, such as for example titanium dioxide. The film may be further activated AC using ultraviolet light. The surface may optionally be coated with films of different chemistries, such as a fluorocarbon film, a metal film, a native silicon oxide film etc. . . . . The film may be formed using a number of known techniques such as chemical vapor deposition, thermal annealing, plasma deposition, physical vapor deposition (evaporation or sputtering), etc. . . . . This alternate embodiment will be described in more details with reference to FIG. 11 hereinafter.

Then, the wetting liquid phase 6 is trapped within the micro-structured surface 1 through a surface priming process PRIM MS.

According to a first alternative PRIM1, the priming process can be achieved according to a vacuum filling technique.

The surface to be primed is submerged SUB inside the wetting liquid phase 6. Then, a vacuum is pulled PUL. Pressure is reduced enough so that the air initially trapped in the surface microstructure expands and, by buoyancy, raises to the surface of the wetting liquid, leaving the pores 3 of the surface microstructure. Advantageously, the pressure is maintained above the vapor pressure of wetting liquid, or else the wetting liquid phase 6 may start boiling. When all the air is released from the pores 3, the pressure can be increased again. Finally, the initial pressure is reestablished INI. Optionally, the cycle may be repeated several times, after which the surface is considered primed. In this state, all pores 3 are filled with the wetting liquid phase 6.

According to a second alternative PRIM2, the priming process can be achieved according to a contacting technique.

The wetting liquid phase 6 is simply put into contact CON with the unprimed surface. Then, they are pressurized PRS. As a result, the air or gas trapped in the microstructure will compress and will slowly dissolve in the wetting liquid phase 6. The air and gas disappear after a determined duration WT T. Finally, the initial pressure is reestablished INI. The resulting surface will be in contact with the wetting liquid phase 6. The contacting technique alternative is simpler to implement than the vacuum filling technique alternative.

Figure 11:
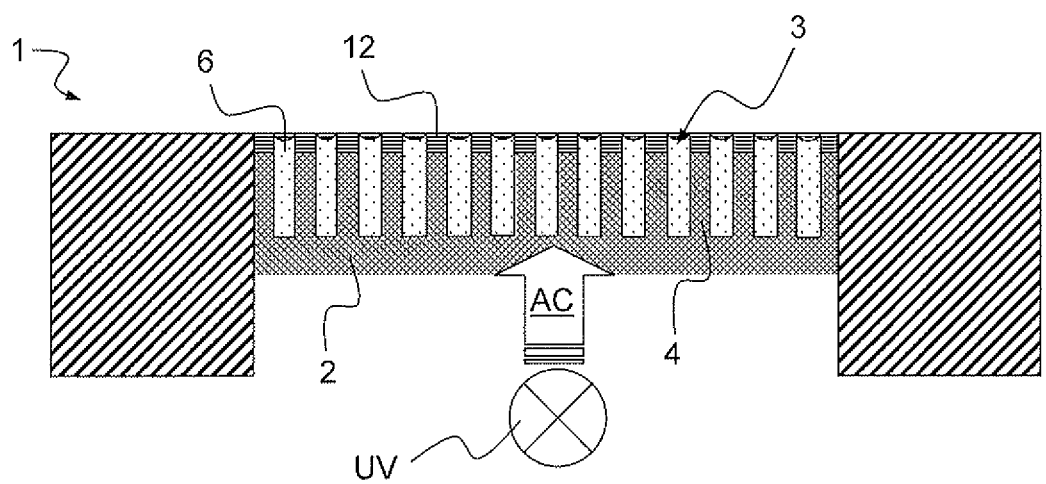
FIG. 11 schematically illustrates an alternate step related to the method of FIG. 10.
Figure 10:
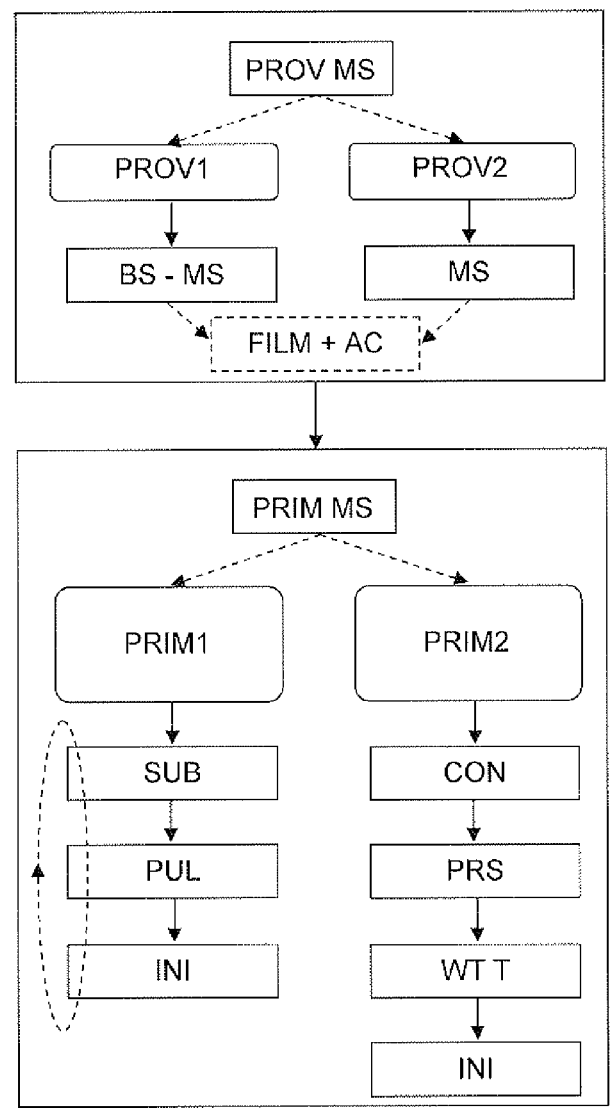
FIG. 10 schematically illustrates a method of manufacturing the micro-structured surface of the disclosure.

FIG. 11 schematically illustrates the alternate step related to the method of FIG. 10 wherein the micro-structured surface 1 is manufactured out of a substrate 2 made of a material transparent to ultraviolet radiation, and coated with a photo-catalytic film 12. As an example, the surface is made of quartz or sapphire and the photo-catalytic film is titanium dioxide having a thickness of 200 nm. The micro-structured surface 1 is illuminated, either continuously or periodically (for example during 5 minutes period), by an ultraviolet light source UV. The ultraviolet light source UV may be a Mercury discharge bulb. The ultraviolet light activates AC the photo-catalytic film. A photo-catalytic film made of titanium dioxide exhibits superhydrophilicity when exposed to ultraviolet radiation. The photo-catalyzed properties of the surface, for example superhydrophilicity, are maintained indefinitely, at least on a long period of time.

The thin titanium dioxide layer may be deposited conformally onto the micro-structured surface according to several distinct processes, such as sputtering, chemical vapor deposition, and atomic layer deposition. The thin titanium dioxide layer may be flooded by short wavelength ultraviolet radiation, which acts as a photo-catalyst, rendering the titanium film superhydrophilic. Advantageously, as the film is conformal and uniformly exposed to UV radiation, the superhydrophilic effect occurs everywhere, including the interior of the pores 3. The surface is then primed with water as the wetting liquid phase 6. The water is trapped within the micro-structured surface, making the whole surface hydrophilic and oleophobic.

When such a micro-structured surface is immersed in an oil-water mixture and continuously bombarded with crude oil droplets from an oil stream, the surface repels the oil droplets and remains water-wet and clean. Such a surface may retain its olephobic properties for long periods of time, e.g. from seven days to one month.

Final Remarks

The drawings and their description hereinbefore illustrate rather than limit the disclosure.

Though, the disclosure has been described in relation with oilfield application where the undesired liquid phase is droplets of oil, this is only a non limitative example of application. The disclosure may have application in other kind of industry, e.g. chemical industry, food-processing industry, etc. . . . .

Any reference sign in a claim should not be construed as limiting the claim. The word "comprising" does not exclude the presence of other elements than those listed in a claim.

The word "a" or "an" preceding an element does not exclude the presence of a plurality of such element.

The invention claimed is:

1. A micro-structured surface immersed in a multiphase fluid mixture comprising a substrate having pores and a wetting liquid phase trapped in the pores, said wetting liquid phase being immiscible with all phases of the multiphase fluid mixture.

2. A micro-structured surface according to claim 1, wherein the substrate receives a chemical treatment improving the wetting of the substrate by the wetting liquid phase.

3. A micro-structured surface according to claim 1, wherein the surface comprises a closed-cell network of micro-wells forming the pores made in the substrate.

4. A micro-structured surface according to claim 1, wherein the surface comprises an open-cell network of micro-pillars forming the pores made on the substrate.

5. A micro-structured surface according to claim 1, wherein the surface comprises a combination of an open-cell network of micro-pillars and a closed-cell network of micro-wells forming the pores in the substrate.

6. A micro-structured surface according to claim 1, wherein the substrate is made of a material chosen in the group of material comprising silicon, silicon oxide, glass, metal, ceramic, sapphire, alumina, titanium oxide, fluorinated polymer, plastics, naturally porous material, mesh, and solid foam.

7. A micro-structured surface according to claim 1, wherein the substrate is covered with a coating film.

8. A micro-structured surface according to claim 7, wherein the film is chosen among the group of film comprising fluoropolymer film, fluorocarbon film, photocatalytic film, titanium dioxide film, silicon dioxide film, and metal film.

9. A micro-structured surface according to claim 1, wherein the wetting liquid phase is a fluorinated solvent.

10. A measuring device comprising: a micro-structured surface immersed in a multiphase fluid mixture comprising:
a substrate having pores and a wetting liquid phase trapped in the pores, said wetting liquid phase being immiscible with all phases of the multiphase fluid mixture.

11. A measuring device according to claim 10, wherein the measuring device further comprises a radiation source for permanently or periodically activating the micro-structured surface by exposure to radiation.

12. A method of manufacturing a micro-structured surface having a controlled wetting property that is immersed in a multiphase fluid mixture comprising:
providing a micro-structured surface, and
trapping a wetting liquid phase within the micro-structured surface through a surface priming process
wherein the wetting liquid phase is immiscible with all phases of the multiphase fluid mixture.

13. A method of manufacturing a micro-structured surface according to claim 12, wherein providing a micro-structured surface further comprises micro-structuring a substrate.

14. A method of manufacturing a micro-structured surface according to claim 13, wherein providing a micro-structured surface consists in providing a naturally porous material.

15. A method of manufacturing a micro-structured surface according to claim 12, wherein providing a micro-structured surface is further followed by conformal coating or film deposition.

16. A method of manufacturing a micro-structured surface according to claim 15, wherein the coating or film having photocatalytic properties is activated upon exposure to a source of radiation.

17. A method of manufacturing a micro-structured surface according to claim 12, wherein the surface priming process comprises:
- submerging the micro-structured surface inside the wetting liquid phase,
- pulling a vacuum by reducing an initial pressure enough so that the gas phases initially trapped in the micro-structured surface leaves the pores of the micro-structured surface; and
- increasing the pressure to the initial pressure.

18. A method of manufacturing a micro-structured surface according to claim 17, wherein the pressure reduction and increasing cycle is repeated several times.

19. A method of manufacturing a micro-structured surface according to claim 12, wherein the surface priming process comprises:
- putting the wetting liquid phase into contact with the micro-structured surface;
- pressurizing the micro-structured surface and the wetting liquid phase such as to allow the gas phases initially trapped in the microstructure to diffuse into the liquid;
- waiting a determined duration; and
- decreasing the pressure to the initial pressure.

\* \* \* \* \*